2,971,368

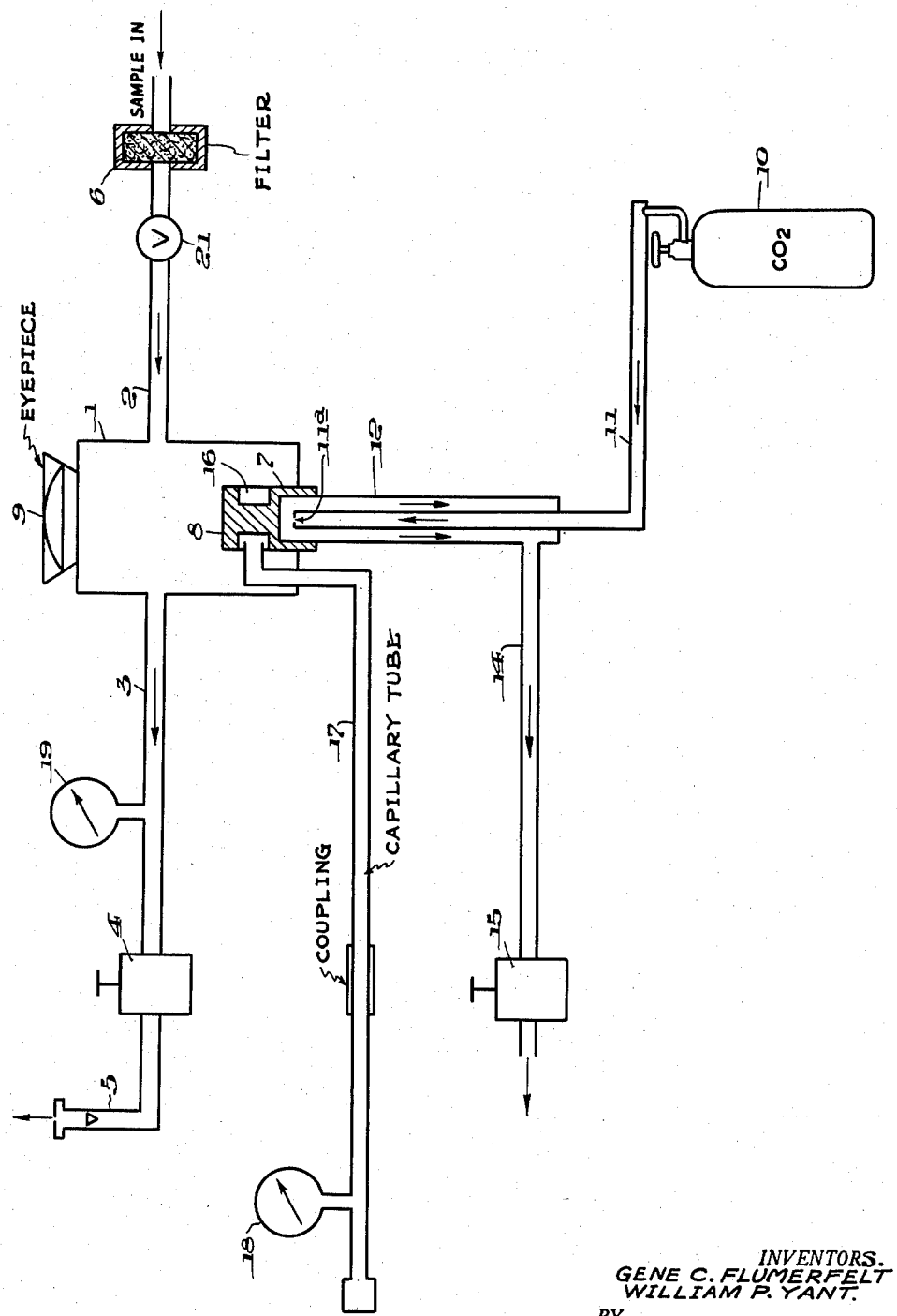

DETERMINATION OF CONCENTRATION OF COMPONENTS OF A GASEOUS MIXTURE

Gene C. Flumerfelt, Wilkinsburg, and William P. Yant, Murraysville, Pa., assignors to Mine Safety Appliances Company, Pittsburgh, Pa., a corporation of Pennsylvania Filed Apr. 12, 1956, Ser. No. 577,704

3 Claims. (Cl. 73—17)

It is commonly necessary in commercial operations and in scientific investigations to determine the concentration of at least one of two or more constituents carried in a gaseous atmosphere. Various ways and means are available for doing so but it is generally true that they are attended by various drawbacks. For instance, the apparatus may be delicate or require skilled technicians for its use, the results obtainable may be of insufficient accuracy for some purposes, or the procedures may be tedious or not sufficiently rapid for some purposes, as for process control.

It is among the objects of this invention to provide a method of determining the concentration of components of a gaseous mixture that is simple, rapid, of satisfactory accuracy for many or most purposes, and which may be practiced by persons not having scientific or technical training.

A further object is to provide an apparatus for practicing the method of the invention that is simple, rugged, and relatively inexpensive, and the operation of which is simple and requires a minimum of manipulative skill and operations.

Other objects will appear from the following specification.

The accompanying drawing is a schematic representation of the preferred embodiment of apparatus provided by the invention.

The method of this invention is predicated upon the ability of liquid of a component of a gaseous mixture to produce a visible effect when in contact with a deposit of another component which has a higher dew point than vapor of said liquid. In other words, the invention is applicable to the determination of the concentration of one or more components of a multicomponent gaseous mixture the components of which have different vapor pressures at their dew points and of which each component of higher dew point will form a deposit that in contact with liquid of a component of lower dew point will produce a visible change.

In accordance with the invention, therefore, the gaseous atmosphere containing gas, or vapor, of two or more substances of different vapor pressures at their dew points is passed into contact with a condensing surface that is progressively cooled until the constituent of higher dew point condenses. If the concentration of that constituent is desired, the dew point is recorded. The temperature of the condensing surface is then reduced until the liquid that has condensed upon it forms a deposit that may be either liquid or solid, according to the substance and the prevailing conditions. Cooling is then continued progressively until the constituent of lower dew point condenses whereupon the liquid thus formed will begin to affect the visual appearance of the deposit of constituent of higher dew point. The occurrence of that phenomenon is readily detectable visually, as will be understood. The exact change in visual appearance will depend, as will be understood, upon the particular substances and their relation to one another. For example, if the constituent of higher dew point forms a crystalline deposit and the two substances are mutually soluble, or the first soluble in the second to deposit, the liquid of the second formed at its dew point will cause dissolution of the edges or points of the crystals of constituent of higher dew point. Or, if the constituent first deposited remains liquid there will be a change in optical property, such as refractive index, when it is contacted by liquid of the constituent of lower dew point. Other changes in optical or physical properties will likewise be detectable, even if the liquid first deposited solidifies in amorphous form. The temperature at which this visual change is initiated provides the dew point of the second constituent. The concentrations desired are then determined from calibration data initially determined in the same way and under the same pressure using known concentrations of the two constituents in the gas in which they are carried.

Having reference now to the drawing, the preferred embodiment of apparatus comprises a gas tight condensing chamber 1 provided with an inlet conduit 2 for introducing the gas sample and with an outlet conduit 3 for discharging it from the container. The outlet conduit is provided with a throttling valve 4 for controlling the rate of flow of the sample and its pressure within container 1. If desired, a rotameter 5 may be associated with conduit 3 beyond valve 4 for measuring the rate of flow of the gas sample through the system. Likewise, if need be, a filter 6 may be interposed in the inlet conduit 2 to remove any solid matter from the gas sample.

A solid metal block 7 of high heat conductivity, such as aluminum, silver or copper, is associated in gas-tight relation with one end of chamber 1, and it is provided with a polished target surface 8. The outer surface of target 8 exposed in chamber 1 provides a condensing surface opposite which an eyepiece 9 is mounted in the other end of chamber 1 for observation of conditions at the target surface.

The condensing, or target, surface 8 is cooled progressively in any appropriate manner. In the embodiment shown the cooling is effected by passing carbon dioxide gas from a conventional pressure bottle 10 through a metallic conduit 11 mounted concentrically within a tubular metallic member 12, such as copper, so that the flow of carbon dioxide emerges from an orifice 11a adjacent the bottom surface 13 of block 7, as shown in the drawing. The $CO_2$ is exhausted through a conduit 14 provided with a regulating valve 15 for controlling the $CO_2$ pressure and hence the temperature of block 7. The cooling effect exerted by the $CO_2$ upon block 7 and its target surface 8 can thus be used for progressively cooling the condensing target 8.

Block 7 is provided also with an annular gas tight space 16 associated with a sealed conduit 17, formed of capillary tubing, provided with a pressure gauge 18. A suitable fluid is sealed under pressure within the system provided by annular space 16 and conduit 17, the fluid being such that the pressure within the system 16—17 varies according to the temperature to which it is exposed, i.e., the temperature of block 7 and consequently that represented by that of the target surface 8.

In the practice of the invention the gas atmosphere to be tested carrying two constituents of the characteristics described above is introduced into chamber 1 through conduit 2 and exhausted through conduit 3 under an appropriate pressure and flow rate as determined by valve 4. If desired for any purpose, the pressure may be indicated by a valve 19 in the outlet conduit. The valve of $CO_2$ bottle 10 is opened to initiate flow of carbon dioxide through conduit 11 and its associated element 12 with cooling of block 7 and consequently of target surface 8 likewise. Progressive cooling is effected by appropriate control of valve 15. When the target surface 8 has been cooled to the dew point temperature of the constituent of higher dew point under the prevailing pressure within chamber 1 and corresponding to its concentration in the gas sample, that constituent will condense upon target surface 8 as evidenced by the formation of a deposit of the constituent, for example as liquid. This is observed through eyepiece 9. Cooling is continued to freeze that liquid with formation of a solid deposit that may be amorphous or crystalline, depending on the particular constituent. Upon further cooling the constituent of lower dew point will condense at the target surface when the temperature reaches that corresponding to its concentration and the pressure within chamber 1. At that point the liquid formed by condensation of the constituent of lower dew point will begin to affect the visual appearance of the initial deposit, as explained above, for example by dissolving crystals of the initial deposit present on the target surface. This change is observed likewise through the eyepiece. The occurrence of this dissolution is readily detectable as explained above, as by the errosion or disappearance of characteristic edges or points of crystals of the initial deposit.

As the temperature within chamber 7 becomes lower the temperature of the fluid within the system 16—17 likewise is lowered with corresponding change in the pressure within the system. That pressure is observed by gauge 18 at the time when the constituent of higher dew point condenses and again when liquid formed from the constituent of lower dew point begins to produce visual alteration of the first deposit. The pressure values thus observed can be readily converted to temperature or concentration values by calibration of the instrument using known concentrations of the two constituents in the gas that carries them and using the steps just outlined. From the values thus obtained with standard samples at standard pressure a graph correlating the pressure in the system 16—17 with the temperature at the target surface 8 can be prepared for use with unknown samples. From such a graph the concentrations are known.

The invention is applicable to any two or more constituents of a gaseous atmosphere which have different vapor pressures and of which each constituent of lower dew point is capable of producing visual change of the deposit of the constituent of higher dew point. As exemplary, however, reference may be made to the determination of mixed vapors of ethylene oxide, water, and carbon dioxide. The gaseous mixture was treated as described above to cause the water vapor to condense at its dew point, cooling further to form ice crystals, and continuing the cooling until the ethylene oxide condensed, at which point the sharply defined boundaries of the ice crystals became indistinct. The end point is sharp because of the characteristic structure of ice crystals. Mixtures containing, by weight, from 5 to 25 percent of ethylene oxide, and of water varying from a sample dried by magnesium perchlorate up to 1.5 percent $H_2O$ were determined in this manner. The maximum error was 1 percent of ethylene oxide while the average error was not greater than $\pm 0.3$ percent.

As indicated above, the invention may be applied to the determination of two such constituents of a gaseous atmosphere, or if the concentration of the constituent of higher dew point is not required the method may be applied only to the determination of that of lower dew point, the method of the invention being desirable for the latter case in instances where it would otherwise be difficult or impractical to do so by other procedures.

The apparatus shown in the drawing and the use of which is described above is, as will be understood, operated under constant pressure and at progressively decreased temperature. However, it may be used likewise at constant temperature and at increased pressure. Thus, with temperatures at target 8 held constant valve 4 may be closed and the pressure of the gas introduced through conduit 2 progressively increased, or, the system may be evacuated through conduit 3, as by a vacuum pump, not shown. Thus, a valve 21 in conduit 2 is closed, the system is then evacuated, valve 4 is then closed, and the pressure of the gas introduced progressively increased by appropriate manipulation of valve 21.

Where more than two constituents are to be determined the procedure is as described above in that there is effected successive deposition on target 8 of the constituents of successively lower dew point, with observation of the visual change that occurs with each successive deposition.

It may happen that some substances will not produce an adequately visible deposit. In such cases sharp end points may be had by adding to the gas sample another constituent that will enhance the observation. For example, liquid produced by dry ethylene at its dew point is of low contrast but by adding a little water vapor to the incoming gas a sharp end point may be observed.

The condensing chamber 1 may be formed of Lucite or other material transparent to light, or various ways of illuminating the target surface 8 may be provided, as will be evident to competent designers. Likewise, details of the apparatus and materials of construction are permissible, and the apparatus may be adapted to, for example, photographic recording of conditions at the target surface correlated with pressure changes in the system 16—17, and if desired, recording of the pressure in the condensing chamber 1.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. That method of determining the concentration of one or more constituents of a gaseous mixture containing a plurality of constituents which have different vapor pressures, comprising contacting the mixture with a heat conducting surface and progressively lowering its temperature to the dew point of the constituent of maximum dew point with formation at said surface of a deposit thereof that is soluble in liquid of next lower dew point, said gaseous mixture initially containing another constituent that cooperates to sharpen the visibility of the deposit, then lowering the temperature until liquid produced by condensation of the next lower dew point constituent begins to form upon said deposit with alteration of its visual appearance, and observing the temperature at which said alteration occurs, said temperature being characteristic of the concentration of said constituent of lower dew point under the prevailing pressure condition at said surface.

2. That method of determining the concentration of one or more constituents of a gaseous mixture containing a plurality of constituents which have different vapor pressures, comprising contacting the mixture with a heat conducting surface in a closed system under conditions of substantially constant pressure and at a temperature at said surface to cause a deposit of the constituent of maximum dew point to form at said surface that is soluble in liquid of next lower dew point, then lowering the temperature at said surface to cause liquid produced by condensation of the next lower dew point constituent to form upon said deposit with alteration of its visual appearance, and observing the temperature at which said alteration occurs, said pressure and temperature being characteristic of the concentration of said constituent of lower dew point.

3. That method of determining the concentration of one or more constituents of a gaseous mixture containing a plurality of constituents which have different vapor pressures, comprising contacting the mixture with a heat conducting surface in a closed system maintained at a substantially constant temperature and under a pressure to cause a deposit of the constituent of maximum dew point to form at said surface that is soluble in liquid of next lower dew point, then increasing the pressure within said chamber to cause liquid produced by condensation of the next lower dew point constituent to form upon said deposit with alteration of its visual appearance, and observing the pressure at which said alteration occurs, said pressure and temperature being characteristic of the concentration of said constituent of lower dew point.

References Cited in the file of this patent

UNITED STATES PATENTS

| | | |
|---|---|---|
| 1,917,272 | Podbielniak | July 11, 1933 |
| 2,429,474 | McMahon | Oct. 21, 1947 |
| 2,566,307 | Boyle | Sept. 4, 1951 |